(12) United States Patent
Kong et al.

(10) Patent No.: US 10,926,238 B2
(45) Date of Patent: Feb. 23, 2021

(54) ELECTRODE ASSEMBLY FOR USE IN A PLASMA GASIFIER THAT CONVERTS COMBUSTIBLE MATERIAL TO SYNTHESIS GAS

(71) Applicant: Cogent Energy Systems, Inc., Annandale, VA (US)

(72) Inventors: Peter C. Kong, Idaho Falls, ID (US); Rodney J. Bitsoi, Rigby, ID (US)

(73) Assignee: Cogent Energy Systems, Inc., Annandale, VA (US)

( * ) Notice: Subject to any disclaimer, the term of this patent is extended or adjusted under 35 U.S.C. 154(b) by 21 days.

(21) Appl. No.: 16/401,283

(22) Filed: May 2, 2019

(65) Prior Publication Data

US 2019/0336935 A1   Nov. 7, 2019

Related U.S. Application Data

(60) Provisional application No. 62/666,698, filed on May 3, 2018.

(51) Int. Cl.
| | | |
|---|---|---|
| *B01J 19/08* | (2006.01) | |
| *C01B 3/02* | (2006.01) | |
| *C10J 3/74* | (2006.01) | |

(52) U.S. Cl.
CPC ............ *B01J 19/088* (2013.01); *C01B 3/02* (2013.01); *C10J 3/74* (2013.01); *B01J 2219/0815* (2013.01); *B01J 2219/0869* (2013.01); *B01J 2219/0871* (2013.01); *B01J 2219/0879* (2013.01); *B01J 2219/0898* (2013.01); *C10J 2200/12* (2013.01)

(58) Field of Classification Search
None
See application file for complete search history.

(56) References Cited

U.S. PATENT DOCUMENTS

| | | |
|---|---|---|
| 3,449,628 A | 6/1969 | Cann |
| 3,453,474 A | 7/1969 | Cann |
| 4,013,867 A | 3/1977 | Fey |
| 4,682,005 A | 7/1987 | Marhic |
| 4,801,435 A | 1/1989 | Tylko |
| 4,958,057 A | 9/1990 | Shiraishi |
| 6,008,464 A | 12/1999 | Donnart |
| 6,475,215 B1 | 11/2002 | Tanrisever |

(Continued)

*Primary Examiner* — Kishor Mayekar
(74) *Attorney, Agent, or Firm* — LaMorte & Associates P.C.

(57) ABSTRACT

An electrode assembly having a tubular support jacket that defines an internal compartment. The internal compartment is actively cooled by coolant. An electrode tip is coupled to the tubular support jacket. The electrode tip receives electricity through the tubular support jacket. An insulator construct surrounds at least part of the tubular support jacket. The insulator construct includes an insulation base, an insulation tube and an insulation cap. A gas supply conduit is interposed between the tubular support jacket and the insulation tube, wherein the gas supply conduit receives a working gas from a working gas supply. A thermally conductive casing surrounds at least part of the insulator construct. The thermally conductive casing is actively cooled. The thermally conductive casing actively cools the insulator construct, the underlying tubular support jacket, and thus the electrode tip. The active cooling reduces over-heating of the electrode tip and prevents excessive consumption and erosion.

18 Claims, 3 Drawing Sheets

(56) References Cited

U.S. PATENT DOCUMENTS

| | | |
|---|---|---|
| 7,411,353 B1 | 8/2008 | Rutberg et al. |
| 7,832,344 B2 | 11/2010 | Capote |
| 8,492,979 B2 | 7/2013 | Ganireddy et al. |
| 2004/0020900 A1 | 2/2004 | Wu |
| 2005/0115933 A1 | 6/2005 | Kong |
| 2006/0049150 A1 | 3/2006 | Severance |
| 2008/0093346 A1 | 4/2008 | Yamaguchi |
| 2008/0217305 A1 | 9/2008 | Sanders |
| 2009/0261081 A1 | 10/2009 | Girold |
| 2012/0138584 A1 | 6/2012 | Ashtekar |
| 2012/0246922 A1 | 10/2012 | Hussary |
| 2013/0277337 A1 | 10/2013 | Murata |

ELECTRODE ASSEMBLY FOR USE IN A PLASMA GASIFIER THAT CONVERTS COMBUSTIBLE MATERIAL TO SYNTHESIS GAS

RELATED APPLICATIONS

This application claims the benefit of U.S. Provisional Patent Application No. 62/666,698 filed May 3, 2018.

BACKGROUND OF THE INVENTION

1. Field of the Invention

The present invention relates generally to plasma arc reactors and systems. More particularly, the present invention relates to the structure of electrodes used within a plasma arc reactor that uses arc plasmas to gasify heterogeneous materials to produce synthesis gas that primarily consists of carbon monoxide and hydrogen.

2. Prior Art Description

A plasma is commonly defined as a collection of charged particles containing equal numbers of positive ions and electrons, as well as excited neutrals. Although exhibiting some properties of a gas, a plasma is also a good conductor of electricity and can be affected by a magnetic field. One way to generate a plasma is to pass a gas through an electric arc. The arc heats the gas by resistive and radiative heating to very high temperatures within a fraction of a second. Essentially, any gas may be used to produce a plasma in such a manner. Thus, inert or neutral gases, such as argon, helium, neon, or nitrogen, may be used. Reductive gases, such as hydrogen, methane, ammonia, or carbon monoxide, may also be used, as may oxidative gases such as oxygen or carbon dioxide, depending upon how the plasma is to be utilized.

Plasma generators, including those used in conjunction with plasma torches and plasma arc reactors, generally create an electric discharge in a working gas to create the plasma. Plasma generators have been formed as direct current (DC) plasma generators, alternating current (AC) plasma generators, radio frequency (RF) plasma generators and microwave (MW) plasma generators. Plasmas generated with RF or MW sources are called inductively coupled plasmas. This is because energy is applied to the working gas using an induction coil or a resonant cavity. The RF or MF signal sent from the source to the induction coil or the resonant cavity results in the ionization of the working gas by induction coupling to produce the plasma. Alternatively, DC and AC type plasma generators typically utilize two or more electrodes (e.g. an anode and cathode) with a voltage applied between them. An arc is formed between the electrodes to heat and ionize the working gas. The resulting plasma may then be used for a specified process application.

In a plasma generator that uses electrodes, the electrode is exposed to both the working gas that becomes plasma and the material that is being heated or burned by the plasma. Additionally, the electrode is exposed to the degrative effects of the arc that erodes the electrode over time. Consequently, electrodes that are used in arc reactors have a limited life and must be periodically removed, cleaned, maintained and/or replaced. Electrodes are complex assemblies. Likewise, the level of sophistication needed to properly remove, repair, maintain and replace electrodes is high. Accordingly, one of the highest costs associated with the operation of an arc plasma reactor is the cost and labor associated with the maintenance of the electrodes.

A continuing need therefore exists for an electrode design that lasts longer and requires less maintenance. One such improved electrode design is described and claimed below.

SUMMARY OF THE INVENTION

This invention is an improved electrode assembly for a DC-DC hybrid plasma reactor system. Such systems are used for industrial applications including gasification of biomass and non-biomass combustible materials to produce synthesis gas. Synthesis gas is mainly composed of CO and $H_2$. The plasma reactor creates a large uniform high temperature (>7000° K) plasma with tailored long residence time for materials processing. The plasma reactor has multiple sets of long electrodes that are placed longitudinally opposite each other within modular plasma units.

Each electrode assembly has a tubular support jacket that defines an internal compartment between a first end and an opposite second end. The internal compartment is actively cooled by coolant stored in a coolant supply. The tubular support jacket is conductive and is electrically coupled to a power supply.

An electrode tip is coupled to the second end of the tubular support jacket. The electrode tip receives electricity through the tubular support jacket. An insulator construct surrounds at least part of the tubular support jacket. The insulator construct includes an insulation base, an insulation tube and an insulation cap, wherein the insulation tube extends between the insulation base and the insulation cap. A gas supply conduit is interposed between the tubular support jacket and the insulation tube, wherein the gas supply conduit receives a working gas from a working gas supply.

A thermally conductive casing surrounds at least part of the insulator construct. The thermally conductive casing is actively cooled by coolant. The thermally conductive casing actively cools the insulator construct and the underlying tubular support jacket. This, in turn, cools the electrode tip. The active cooling reduces over-heating of the electrode tip and prevents excessive consumption and erosion of the electrode tip.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention electrode assembly can be embodied in many ways, only one exemplary embodiment has been selected for the purposes of illustration and discussion. The exemplary embodiment represents one of the best modes contemplated for the invention. The illustrated embodiment, however, is merely exemplary and should not be considered a limitation when interpreting the scope of the claims.

Figure 1:
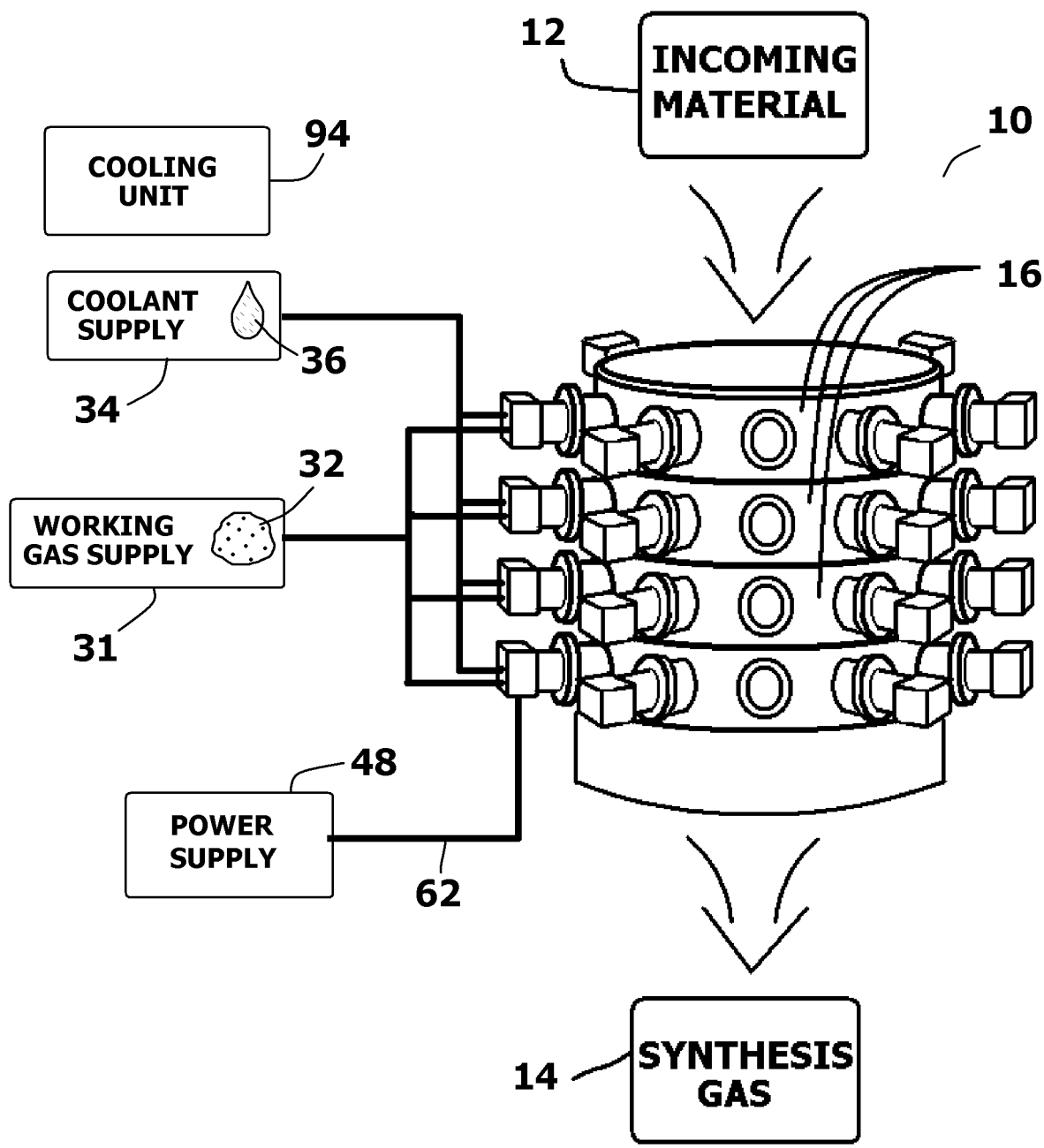
FIG. 1 is a front view and schematic of an exemplary embodiment of a plasma gasifier apparatus containing multiple plasma units.

Referring to FIG. 1, a plasma gasifier system 10 is shown that internally generates a hybrid plasma. The plasma is used to process incoming material 12 and convert that incoming material 12 into a synthesis gas 14. The plasma gasifier system 10 contains one or more plasma units 16 that are concentrically stacked. Although one plasma unit 16 can be used, performance is optimized through the use of a plurality of plasma units 16. In this description, the term "hybrid" is used to refer to a "field free" (current and voltage free) plasma flame from one or more of the plasma units 16 to a "field active" (current and voltage active) arc state by superimposing an electric discharge within one or more plasma units 16. During operations, the plasma gasifier system 10 is connected to a coolant supply 34 that supplies coolant 36, a working gas supply 31 that provides a working gas 32, and a power supply 48 that provides electricity.

Figure 2:
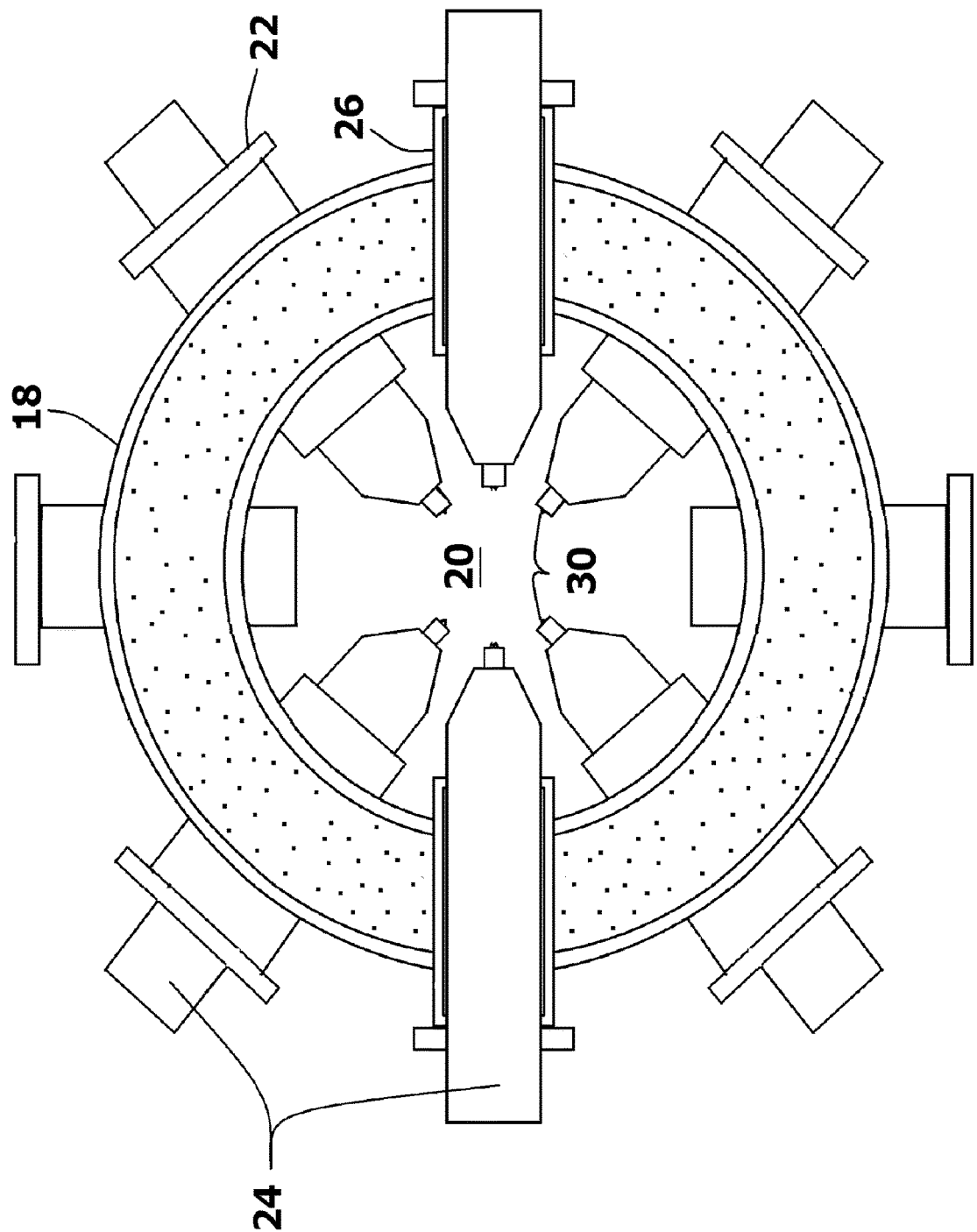
FIG. 2 is a selectively cross-sectioned top view of a plasma unit used in the exemplary embodiment of a plasma gasifier apparatus.

Referring to FIG. 2 in conjunction with FIG. 1, it can be seen that each plasma unit 16 has an annular body 18. The annular body 18 defines a central plasma zone 20. A plurality of access ports 22 are provided in the annular body 16 to accommodate electrode assemblies 24. The electrode assemblies 24 typically have an opposing orientation across the central plasma zone 20 so that they will produce plasma along an arc that extends across the central plasma zone 20. Each of the electrode assemblies 24 is surrounded by an insulation jacket 26 that is sized to pass into the access ports 22 with tight tolerances. The tolerances prevent any significant gaps from existing that can leak plasma out of the plasma gasifier system 10 during operations.

Figure 3:
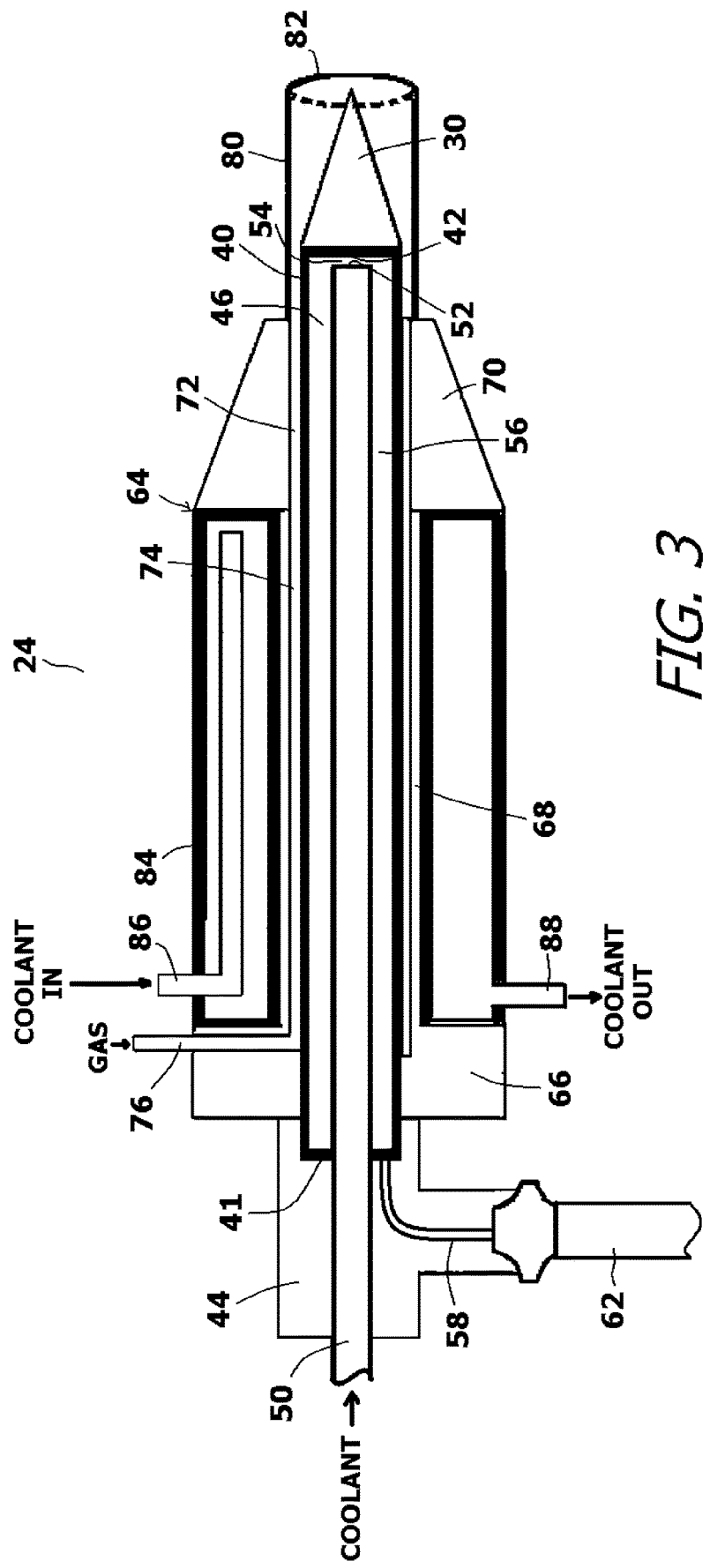
FIG. 3 is a cross-sectional view of an electrode assembly used within the plasma gasifier apparatus.

Referring to FIG. 3, in conjunction with FIG. 2 and FIG. 1, it will be understood that each of the electrode assemblies 24 contains an electrode tip 30. The electrode tip 30 extends into the central plasma zone 20 and creates an arc with another electrode tip 30 from a different electrode assembly 24. The working gas supply 31 introduces the working gas 32 into the central plasma zone 20. The working gas 32 is converted into plasma by the arc between the electrode tips 30. In addition to being coupled to a working gas supply 31, each electrode assembly 24 is also receives the coolant 36 from the coolant supply 34 to control the temperature of the electrode assembly 24.

From FIG. 3, it can be seen that the electrode tip 30 of each of the electrode assemblies 24 is made of a tungsten, tungsten alloy, or some other high-temperature conductive materials. The electrode tip 30 is mounted to the end of a tubular support jacket 40. The tubular support jacket 40 is highly conductive and has a first end 41 and an opposite second end 42. The second end 42 of the tubular support jacket 40 terminates with the electrode tip 30, wherein the electrode tip 30 seals the second end 42 or is directly mounted to a sealed second end 42. The opposite first end 41 of the tubular support jacket 40 is coupled to an electrode base 44. The electrode base 44 is connected to the electrical power supply 48, wherein the electrode base 44 receives current from the power supply 48. Any current received at the electrode base 44, travels through the electrode base 44 and into the tubular support jacket 40. The current then flows through the material of the tubular support jacket 40 and into the electrode tip 30.

The tubular support jacket 40 defines an internal compartment 46. The coolant 36 is introduced into the internal compartment 46 through a supply tube 50. The supply tube 50 has a dispensing end 52 that terminates in the internal compartment 46 just short of the electrode tip 30. This produces a small gap 54 of between one and five millimeters between the dispensing end 52 of the supply tube 50 and the electrode tip 30. In this manner, any coolant 36 pumped through the supply tube 50 will impinge directly upon the electrode tip 30, therein directly actively cooling the electrode tip 30.

The supply tube 50 has a smaller outside diameter than the inside diameter of the internal compartment 46. As a consequence, a drain gap 56 exists between the interior of the tubular support jacket 40 and the exterior of the supply tube 50. This drain gap 56 receives the coolant 36 after the coolant 36 is pumped against the electrode tip 30. The draining coolant 36 is directed back into the electrode base 44. The electrode base 44 contains one or more conduits 58 that channel the coolant 36 into a coolant outlet 60. The coolant 36 may surround at least some parts of a power cable 62 that leads from the power supply 48. In this manner, the coolant 36 can actively cool the power cable 62.

The flow of the coolant 36 into and out of the internal compartment 46 of the tubular support jacket 40 directly cools the electrode tip 30 and the tubular support jacket 40 during operation.

An insulator construct 64 surrounds the tubular support jacket 40. The insulator construct 64 includes an insulation base 66, an elongated insulation tube 68 and a protective insulation cap 70. The insulation cap 70 is annular and defines a central opening 72. The tubular support jacket 40 extends through the central opening 72 in the insulation cap 70, therein supporting the electrode tip 30 just ahead of the insulation cap 70. The insulation cap 70 is exposed to the high heat of the central plasma zone 20. As such, the insulation cap 70 is preferably made of a ceramic material that can withstand the high operating temperatures. The insulation base 66 is also annular and surrounds the tubular support jacket 40 proximate the first end 41 of the tubular support jacket 40. The elongated insulation tube 68 extends around the tubular support jacket 40 between the insulation base 66 to the insulation cap 70. The insulation base 66 and the elongated insulation tube 68 can be fabricated as a single piece, wherein the two elements are molded from tempered glass, ceramic, and/or a high-temperature polymer.

The elongated insulation tube 68 does not contact the inner tubular support jacket 40. Rather, a gap space separates the elongated insulation tube 68 from the tubular support jacket 40, therein forming a gas supply conduit 74. Likewise, the insulation cap 70 also does not contact the tubular support jacket 40. A gap separates the insulation cap 70 from the tubular support jacket 40, therein continuing the gas supply conduit 74. A gas supply line 76 extends into the insulation base 66 of the insulator construct 64 and connects the gas supply 28 to the gas supply conduit 74. As the working gas 32 flows from the working gas supply 31 into the gas supply line 76, the working gas 32 flows into the gas supply conduit 74 and runs along the length of the tubular support jacket 40.

A protective collar 80 is mounted around the electrode tip 30. The protective collar 80 is dielectric and capable of maintaining integrity in the high temperature environment of the central plasma zone 20. The protective collar 80 has a first open end 82 that connects to the insulation cap 70. The gas supply conduit 74 extends through the insulation cap 70 and discharges into the protective collar 80 between the protective collar 80 and the electrode tip 30. The working gas 32 flows into the protective collar 80 and is confined around the electrode tip 30. The working gas 32 can only enter the central plasma zone 20 by flowing past the electrode tip 30 where it forms an arc. In this manner, the working gas 32 is turned to plasma by the arc as it enters the central plasma zone 20.

A cylindrical casing 84 surrounds most of the elongated insulation tube 68, wherein the cylindrical casing 84 is interposed between the insulation base 66 and the insulation cap 70. The gas supply conduit 74 and the elongated insulation tube 68 separate the cylindrical casing 84 from the tubular support jacket 40. The cylindrical casing 84 is made of a highly thermally conductive material. Furthermore, the cylindrical casing 84 is hollow. The interior of the cylindrical casing 84 is cooled with a flow of coolant 36 that flows through the cylindrical casing 84 from an input port 86 to an output port 88. The cylindrical casing 84, therefore acts as an actively cooled heat sink. The cylindrical casing 84 absorbs heat directly from the insulation cap 70. The cylindrical casing 84 also absorbs heat passing through the elongated insulation tube 68. Lastly, the cylindrical casing 84 absorbs heat from the insulation base 66. It will therefore be understood that during operations, the tubular support jacket 40 is internally cooled by the coolant 36 flowing within the internal compartment 46 and externally cooled by the coolant 36 flowing through the cylindrical casing 84. Additionally, the flowing working gas 32 cools the tubular support jacket 40. This, in turn, cools the electrode tip 30. The active cooling reduces over-heating of the electrode tip 30 and prevents excessive consumption and erosion of the electrode tip 30. Furthermore, the high electrical conductivity of the tubular support jacket 40 reduces junction resistive heating. This allows high joule heating to occur at the electrode tip 30 for better thermionic emission of electrons that form and sustain an arc.

Referring back to FIG. 1 and FIG. 2, it will be understood that in operation, each set of electrode assemblies 24, one anode and one cathode, are coupled to the power supply 48. The electrode assemblies 24 are preferably connected to the power supply 48 using the coolant-cooled cables 62. The coolant 36 is pumped through each of the electrode assemblies 24. After cooling the electrode assemblies 24, the coolant 36 exits each electrode assembly 24 and is stored. When fresh water is available, the coolant 36 can kept cold by a cooling unit 94, such as a portable water heat exchanger. In another embodiment, when fresh water is not available, the cooling unit 94 can be a refrigeration unit or a chemical based chiller.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. An electrode assembly for use in a plasma gasifier that has a coolant supply that supplies coolant, a working gas supply that supplied a working gas and a power supply, said assembly comprising:
    a tubular support jacket that has a first end and an opposite second end, said tubular support jacket defining an internal compartment, wherein said internal compartment is actively cooled with the coolant from said coolant supply, and wherein said tubular support jacket is electrically coupled to said power supply;
    an electrode tip coupled to said second end of said tubular support jacket, wherein said electrode tip extends from said second end in a direction opposite said first end of said tubular support jacket; and
    an insulator construct surrounding at least part of said tubular support jacket;
    a thermally conductive casing surrounding at least part of said insulator construct, wherein said thermally conductive casing contains a hollow that is actively cooled by said coolant from said coolant supply, and wherein said insulator construct electrically insulates said thermally conductive casing from said tubular support jacket.

2. The electrode assembly according to claim 1, wherein said insulator construct includes an insulation base, an insulation tube and an insulation cap, and wherein said insulation tube extends between said insulation base and said insulation cap.

3. The electrode assembly according to claim 2, wherein a gas supply conduit is interposed between said tubular support jacket and at least part of said insulator construct.

4. The electrode assembly according to claim 3, wherein said gas supply conduit is interposed between said tubular support jacket and said insulation tube.

5. The electrode assembly according to claim 4, wherein said gas supply conduit receives said working gas from said working gas supply.

6. The electrode assembly according to claim 5, further including a protective collar that surrounds said electrode tip, wherein said gas supply conduit directs said working gas into said protective collar.

7. The electrode assembly according to claim 6, wherein said protective collar is connected to said insulation cap.

8. The electrode assembly according to claim 1, further including a supply tube that extends into said internal compartment of said tubular support jacket, wherein said supply tube supplies said coolant into said internal compartment from said coolant supply.

9. The electrode assembly according to claim 8, wherein said coolant exits said supply tube in said internal compartment proximate said electrode tip at said second end of said internal compartment.

10. The electrode assembly according to claim 1, further including an electrode base that is electrically connected to said power supply, wherein said first end of said tubular support jacket is connected to said electrode base, and wherein said electrode base contains a drain conduit for draining said internal chamber of said tubular support jacket.

11. An electrode assembly for use in a plasma gasifier that has a coolant supply that supplies coolant, a working gas supply that supplies a working gas, and a power supply, said assembly comprising:
    a tubular support jacket that defines an internal compartment, wherein said internal compartment is actively cooled from said coolant supply, and wherein said tubular support jacket is electrically coupled to said power supply;
    an electrode tip coupled to said tubular support jacket;
    an insulator construct surrounding at least part of said tubular support jacket;
    a thermally conductive casing surrounding at least part of said insulator construct, wherein said thermally conductive casing is hollow and is actively cooled by said coolant from said coolant supply; and
    a gas supply conduit is interposed between said tubular support jacket and at least part of said insulator construct.

12. The electrode assembly according to claim 11, wherein said insulator construct includes an insulation base, an insulation tube and an insulation cap, wherein said insulation tube extends between said insulation base and said insulation cap, and wherein said conductive casing surrounds said insulation tube.

13. The electrode assembly according to claim 12, wherein said gas supply conduit is interposed between said tubular support jacket and said insulation tube.

14. The electrode assembly according to claim 13, wherein said gas supply conduit receives said working gas from said working gas supply.

15. The electrode assembly according to claim 14, further including a protective collar that surrounds said electrode tip, wherein said gas supply conduit directs said working gas into said protective collar.

16. The electrode assembly according to claim 15, wherein said protective collar is connected to said insulation cap.

17. The electrode assembly according to claim 11, further including a supply tube that extends into said internal compartment of said tubular support jacket, wherein said supply tube supplies a coolant into said internal compartment from said coolant supply.

18. The electrode assembly according to claim 17, wherein said coolant exits said supply tube in said internal compartment proximate said electrode tip at said internal compartment.

\* \* \* \* \*